Jan. 13, 1953  C. B. McBRIDE ET AL  2,625,240
APPARATUS FOR SEPARATING SUSPENDED PARTICLES FROM GASES
Filed Oct. 17, 1950  3 Sheets-Sheet 1

INVENTORS
CHARLES B. McBRIDE
PHILIP F. BEST
SIDNEY R. OREM, JR.
BY Benj. T. Rauber
THEIR ATTORNEY

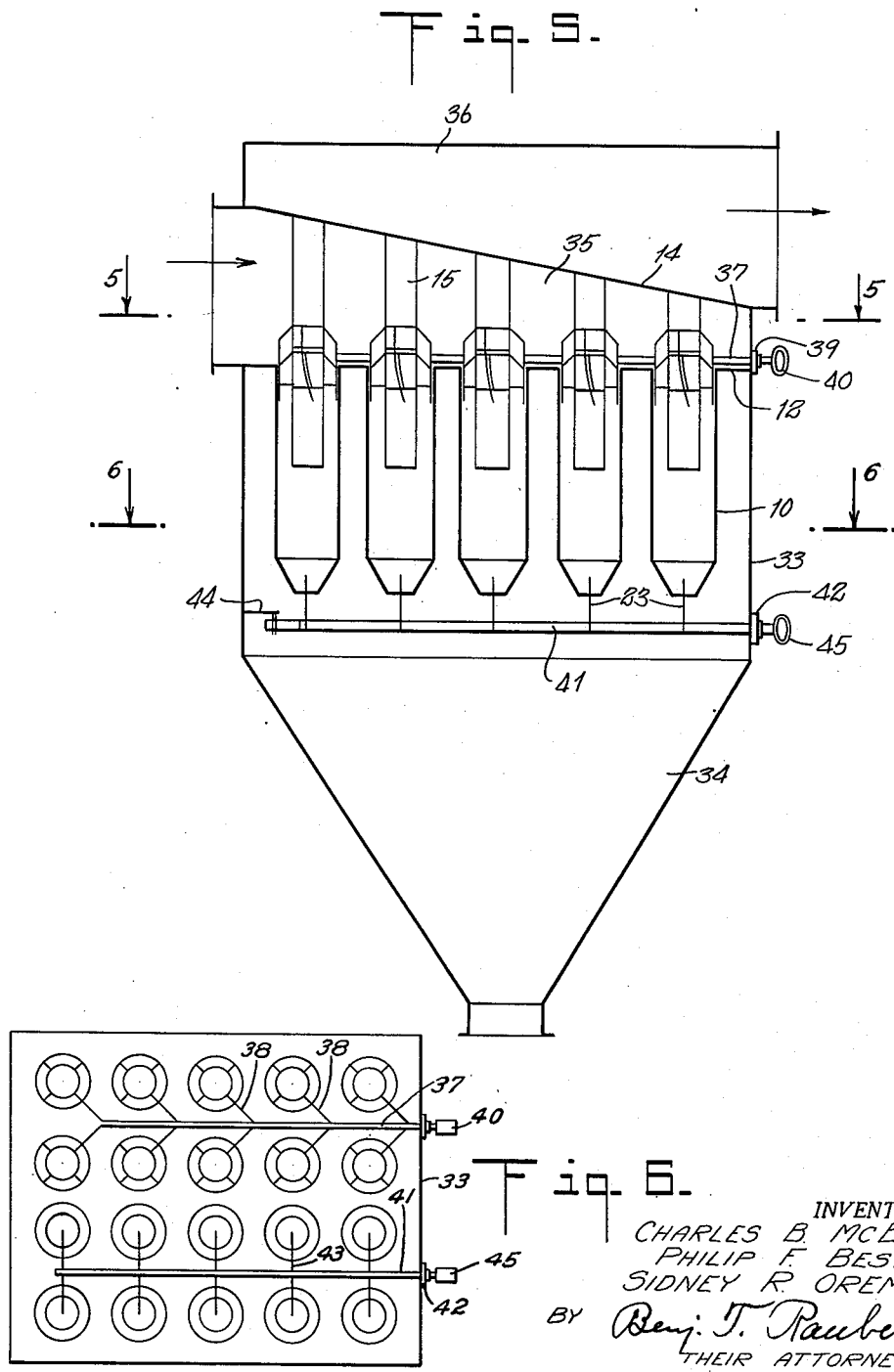

Jan. 13, 1953     C. B. McBRIDE ET AL     2,625,240
APPARATUS FOR SEPARATING SUSPENDED PARTICLES FROM GASES
Filed Oct. 17, 1950                          3 Sheets-Sheet 3
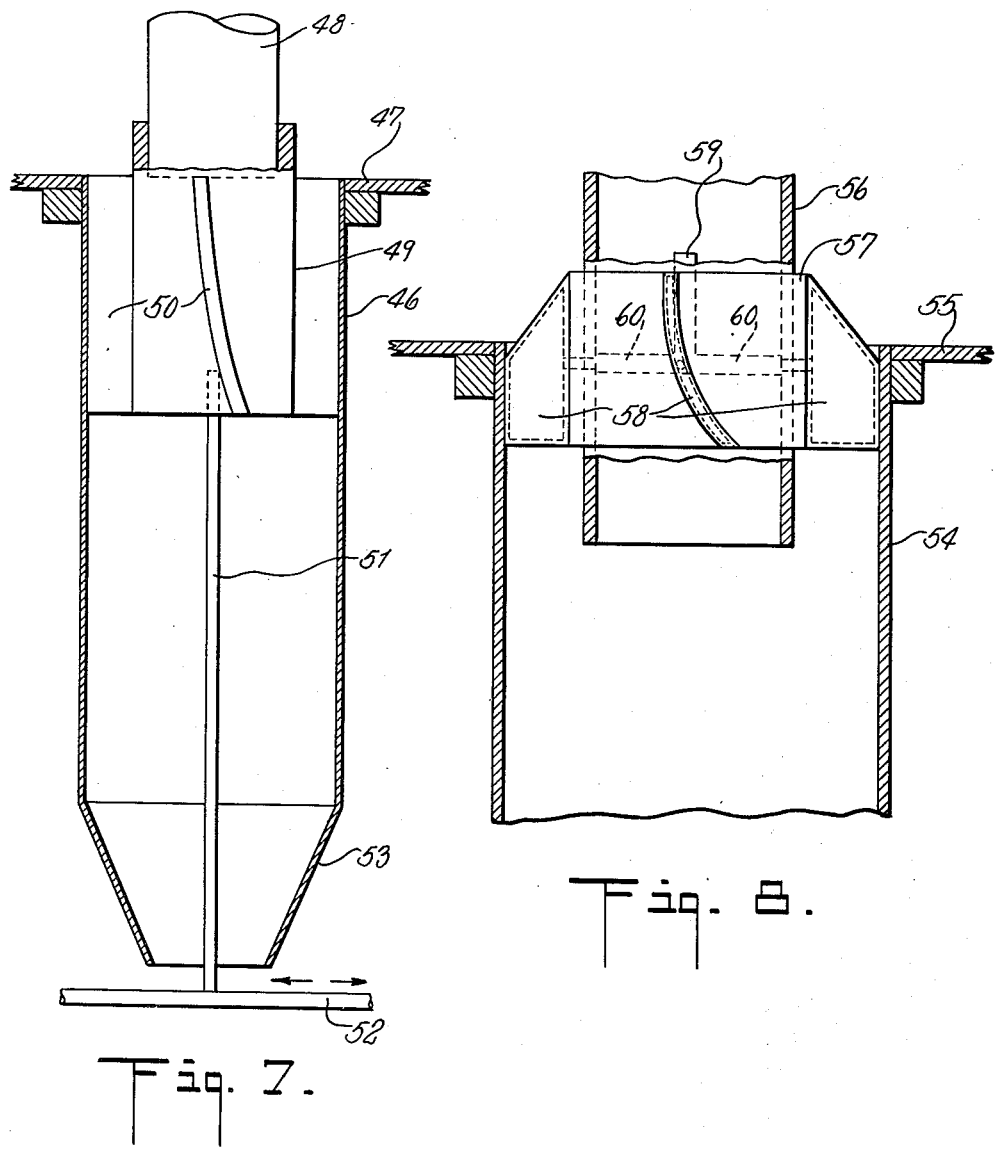
INVENTORS
CHARLES B. McBRIDE
PHILIP F. BEST
SIDNEY R. OREM, JR.
BY Benj. T. Rauber
THEIR ATTORNEY Patented Jan. 13, 1953

2,625,240

UNITED STATES PATENT OFFICE 2,625,240

APPARATUS FOR SEPARATING SUSPENDED PARTICLES FROM GASES

Charles B. McBride, Port Chester, N. Y., and Philip F. Best and Sidney R. Orem, Jr., Riverside, Conn., assignors to The Thermix Corporation, Greenwich, Conn., a corporation of Connecticut Application October 17, 1950, Serial No. 190,542

13 Claims. (Cl. 183—76)

Our present invention relates to apparatus for separating suspended particles from air or other gases and, more particularly, for the separation of particles which have a tendency to adhere to, and form deposits on, the surfaces or in the passages of the separators.

Our invention provides a separating apparatus in which such deposits may be loosened or detached from the surfaces and passages without stopping or interrupting the operation of the separator.

Heretofore in separating apparatus, particularly in multi-type centrifugal separators, rapping the walls and partitions with mechanically operated hammers or sweeping them with chains or scrapers were relied on to free them from deposits of separated material. Such devices are undesirable for many reasons and are not entirely effective, particularly in the separation of particles which have a tendency to adhere to the surfaces and passages of the apparatus and build up progressively, thereby obstructing the flow and causing a resistance to flow and a pressure drop, and eventually entirely choking or clogging the apparatus. In such cases periodic cleaning of the apparatus has been necessary with a consequent interruption of the separating operation. In some instances, particularly in certain chemical industries, it is impractical to interrupt the processes and for this reason, use of centrifugal or electrical separators has been limited.

In our present invention we provide apparatus whereby the deposits may be loosened or shaken free from the walls or passages of the apparatus and may then readily fall in the form of cakes or masses into a suitable collecting bin or receptacle or be swept from the passages.

The apparatus may be used as a preliminary separator for electric precipitators thereby removing the major portion of the load or burden on the electric precipitator so that it requires less frequent cleaning.

In our present invention, parts of the apparatus on which the separated particles tend to deposit are formed of flexible material which may be periodically distorted so as to break up deposits, freeing them from the surfaces on which they have deposited and permitting them to fall into the receiving bin or receptacle. Such flexible material tends to return to its original shape or form when released from the distorting element. And by releasing the distorted parts suddenly, the material will tend to snap back, thus giving a sharp blow to any deposited material that has not been freed by the bending or flexing of the surface on which it has deposited.

Any suitable flexing material that has a form or shape memory, that is, the quality of returning to its original shape upon release of the distorting stress, may be employed.

For use at ordinary temperatures well vulcanized rubber may, for example, be employed. Other plastics may be employed to meet special temperature or corrosion conditions. For example, for use at higher temperatures silicone rubber may be employed or various cellulose compounds. Other compositions which may be employed to meet special conditions are the vinyl chloride-acetate resins; the vinyl butyral resins; polyethylene resins; polytetrafluoroethylene, and the organic polysulfide molding compounds, and others.

There is a wide variety of such compositions which may be selected for use to meet particular conditions and the present invention is not concerned with any particular material. The requisite is that it shall be able to withstand the conditions of use as to temperature and corrosion and that it shall have a sufficient flexibility to permit it to be distorted and a sufficient resiliency and rigidity to enable it to return to its original shape or form, or approximately so, immediately upon release of the distorting stress.

In the application of the invention to centrifugal separators the cylinder or tube may be made of any suitable flexible material such as those mentioned above, and means may be provided for bending or distorting the tube. Such means may be an element that may engage a side or edge of the tube and force it sidewise changing the curvature and breaking loose any deposited material. Or the cylinder or tube may be enclosed in a rigid enclosure to which a pressure fluid or gas may be admitted periodically to contract the walls of the tube.

In the case of multi-tubular separators, the inlet vanes, made of a suitable flexible material, may be distorted by a moving element or by a relative movement of elements of the apparatus so as to bend the vanes and then release them. For example, the vanes may be made with a free edge adjacent the tube and with a moving arm or cleat so that upon relative movement of the vanes or arm or cleat, the vanes will be bent from radial or other position until they clear the obstruction, whereupon they will snap back to their original position. This may be accomplished by rotating either the vanes or the distorting element. Or the elements of centrifugal apparatus may be made hollow to be inflated periodically to bend or distort the walls and free them of deposits.

The various features of our invention are illustrated, by way of example, in the accompanying drawings in which Fig. 1 is a longitudinal section of a tubular centrifugal separating element embodying a preferred form of the invention;

Fig. 5 is a vertical view of a multitubular centrifugal apparatus embodying the elements of Fig. 1 and showing operating means for distorting the elements;

Fig. 6 is a sectional view taken, half on line 5—5 and half on line 6—6 of Fig. 5;

Fig. 7 is a vertical section of another modification of a tube and its distorting means;

Fig. 8 is a similar view of a tube having a pneumatic distorting means;

Figure 1:
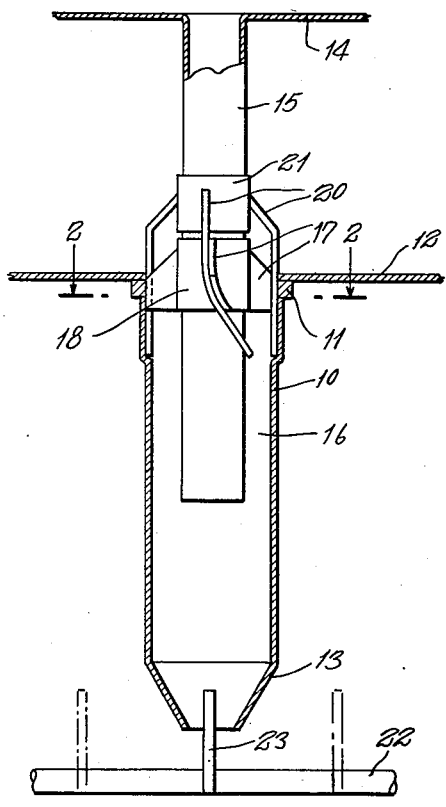
Figure 2:
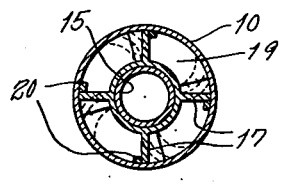
Fig. 2 is a section, taken on line 2—2 of Fig. 1, the position of the vanes being shown in their normal position in full lines and in their distorted position in broken lines.

Referring more particularly to the embodiment of the invention shown in Figs. 1 and 2, the separating element comprises a centrifugal tube 10 having a rigid mounting ring or element 11 by which it is mounted in the lower tube sheet 12 of the apparatus and may be provided at the opposite or dust delivering end with a cone 13. The tube 10 is formed of a flexible material, such as one of the materials mentioned above, but having sufficient rigidity normally to retain its cylindrical shape and to return to its original shape after being distorted.

Extending downwardly from an upper tube sheet 14 of the apparatus is an outlet pipe 15, which may be of rigid material and which extends downwardly into the tube 10 to form an annular passage 16. The tube 10 is open at the end secured in the lower tube sheet 12 and the ends of the pipe 15 are also open.

Dust laden gases pass from an inlet or plenum chamber formed between the tube sheets 12 and 14 into the annular passage 16 between guiding and directional vanes 17. These vanes may be mounted on a rigid collar 18 and extend radially outwardly to the inner surface of the tube 10. The outer edges of the vanes 17 may, however, be free rather than secured to the tube 10.

The vanes 17 form inlet passages 19 at the entrance end to the annular passages 16 and are curved or inclined in the longitudinal direction of the passages, as shown in Fig. 1, so as to form rotatory passages whereby the entering gases are caused to rotate in the annular passage 16 and throw outwardly the suspended particles by centrifugal action or force.

In the case of particles which have a tendency to adhere to each other or to surfaces onto which they are thrown, a deposit of such material builds up on the inner surface of the tube 10 and on the surfaces of the vanes 17, particularly on those surfaces against which the particles strike. This causes a layer or crust of such deposited material to form. To dislodge the latter from the surfaces of the vanes and from the upper surface of the passages 19, a number of arms 20 are mounted on a rotatable collar 21 on the pipe 15 extending outwardly and downwardly into the rotatory passages 19. The lower parts of the arms within the passages are preferably shaped approximately to the contour of the outer edges of the vanes 17 and normally are positioned on the marginal surfaces of the vanes, giving the vanes additional support.

To dislodge the deposited material the collar 21 is rotated on the pipe 15 so as to bend the vanes 17 as indicated in Fig. 2. If the arms 20 are rotated sufficiently they may pass the edges of the vanes which will thereupon snap back. This, together with the flexing of the vanes, frees and breaks up any cakes or crusts that have been formed on the surface of the vanes and also shakes loose any adhering particles. The arms 20 may move progressively to the next vane and may then remain in this position, or until the next period, or they may return to their original position. Preferably they are given a sufficient turn to sweep the spaces between the vanes and free the inner surface of the tube from any deposits that may adhere thereto.

To free the portion of the tube below the vanes from adhering deposits, the tube is preferably bent sidewise causing the walls to flex and distort so that the cakes or crusts of deposit, which may be relatively stiffer, are broken up and fall through the cone 13 into a collecting bin or receptacle.

To bend and distort the tubes 10 there is provided a sliding rod 22, below the tube 10, with pins 23 which project upwardly into the tubes so that upon sliding the rod a pin will be brought into contact with the tube wall and then upon further movement cause it to bend. It will be apparent that other engaging elements than the pins 22 may be used to produce the same or similar bending or distortion of the tube.

It will be apparent that to deflect or distort the vanes 17 a relative movement between the vanes and distorting element, such as the arms 20, is sufficient and that this relative movement may be accomplished by moving the arms or distorting elements or the vanes.

Figure 3:
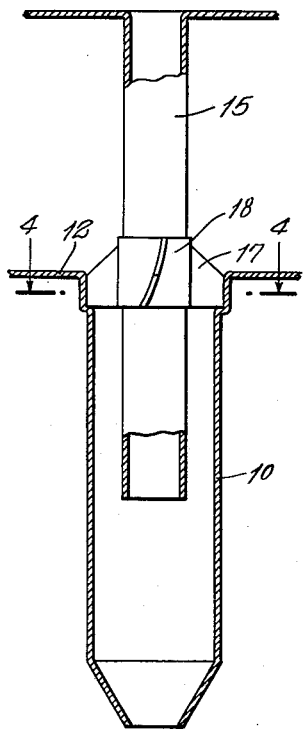
Fig. 3 is a view similar to that of Fig. 1 of a modification of the tubular element.

In the modification shown in Fig. 3 the vanes 17 are mounted on a collar 18 which is rotatable on the outlet pipe 15 so that the vanes may be rotated or rocked about the pipe 15. The outer edges of the vane 17 are normally engaged in recesses 24 of corresponding shape and curvature in the wall of the tube 10 and are, therefore, fixed in position.

Figure 4:
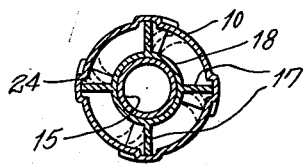
Fig. 4 is a section taken on line 4—4 of Fig. 3.

Upon rotating the collar 18, as indicated in Fig. 4, the vanes 17 will be bent and distorted sufficiently to enable their free ends to be drawn from the recesses 24. Upon reaching the next recess they will again snap into position. They may remain in the recesses into which they have snapped, or may return to their original position and snap into the recesses from which they have been drawn.

In Figs. 5 and 6 there are shown arrangements of several centrifugal elements of the type illustrated in Figs. 1 to 4. In this embodiment of the invention a number of elements 10 are mounted in an enclosure 33 the lower end of which is of inverted-conical or hopper-shape to form a dust bin 34, and the upper end of which is enclosed by the lower tube sheet 12. An inlet or plenum chamber 35 is formed between the lower tube sheet 12 and the upper tube sheet 14 and the outlet pipes 15 deliver into an outlet chamber 36.

Projecting into the inlet or plenum chamber 35 is a slidable rod 37 to which are pivotally secured a number of arms 38 within the chamber 35 each connected to an individual collar 21 or 18 of the respective tubular elements of Figs. 1 or 3. The sliding bar 37 passes through a suitable stuffing box 39 and is provided with a handle or other means 40 whereby it may be reciprocated to give the arms 38 a rotation from one position to the other to flex the vanes 17 of the respective elements. Similarly a sliding bar 41 extends through a stuffing box 42 in the wall of the enclosure 33 and is provided with arms 43 each of which carries one of the pins 23, as shown in Fig. 1, for agitating or flexing its individual tube 10. This rod may be supported at its free end in a bracket 44 at the opposite end of the enclosure from the stuffing box 42. And it may be provided with a handle 45 whereby it may be shifted longitudinally.

It will be understood that when a deposit has formed on the walls of the cylinder, as may be indicated by an increase in the pressure drop, the rods 37 and 41 may be shifted back and forth breaking up the deposits and permitting them to drop into the bin 34. Such shifting of the rod may be done either manually or by any suitable mechanism.

In the modification shown in Fig. 7 a centrifugal tube 46 is mounted in a supporting plate 47, made of flexible resilient material such as rubber. An off-take pipe 48 terminates at the plate 47 but has a flexible extension 49 extending axially into the tube 46 and is provided with deflecting vanes 50, also of flexible resilient material. The extension 49 and vanes 50 may be molded integrally of rubber or similar flexible material that will promptly return to its shape after distortion. The tube 46 and the extension 49 and vanes 50 are distorted when shaken or vibrated by means of a rod 51 extending upwardly from a movable supporting bar 52. The rod 51 is normally coaxial with the tube 46 but may be shifted back and forth against the lower part of the tube 46 which is contracted as at 53, and also against the lower part of the extension 49 so that both the tube and the extension and the vanes may be periodically distorted or shaken to move deposited material that may have formed on their surfaces.

In the modification shown in Fig. 8 a tube 54, which may be either of flexible or rigid material and mounted in a suitable supporting plate 55, is provided with an off-take pipe 56 which may also be either rigid or flexible.

Mounted on the off-take pipe 56 is a collar 57 which carries a number of deflecting vanes 58 extending in the annular space between the off-take pipe 56 and the tube 54 and inclined to give a rotatory motion to the gases entering the tube 54. The vanes 58 are of flexible resilient material as, for example, rubber, and are hollow. Communication from a suitable source of air or of gas under pressure to the interiors of the vanes is provided by means of an inlet pipe 59 having branches 60 to the interiors of the vanes. Impulses or puffs of air or gas may be transmitted to the interiors of the vanes to shake them free of any accumulated deposits.

Through our invention the surfaces of mechanical separators and the interiors of flues and conduits may be freed or maintained free of deposits of particulate matter with substantial uniformity and without interruption of the separation of the particulate material or of the use of the apparatus. This is accomplished without shock to the apparatus and with substantial uniformity throughout the area on which the deposit occurs.

What we claim is:

1. A centrifugal separating element which comprises a centrifugal tube, an open ended off-take pipe extending through one end of said tube to form an annular passage at said end of said tube, deflecting vanes of flexible resilient material in said passage extending radially thereof and inclined to the length of the tube to form rotatory passages, and an element having a relative rotational movement to said vanes to distort said vanes.

2. A centrifugal separating element which comprises a centrifugal tube, an open ended off-take pipe extending through one end of said tube to form an annular passage at said end of said tube, deflecting vanes of flexible resilient material in said passage extending radially thereof and inclined to the length of the tube to form rotatory passages, said vanes having a free edge and an element having relative rotational movement to said vanes to move said free edge and to distort said vanes and then to release said vanes to return to their original shape and position.

3. A centrifugal separating element which comprises a centrifugal tube, an open ended off-take pipe extending through one end of said tube to form an annular passage at said end, deflecting vanes of flexible resilient material secured on said off-take pipe and extending radially in said passage to a free edge adjacent said tube and inclined to the length of the tube to form rotatory passages, and an arm rotatably mounted on said off-take tube relative to said vanes to sweep past the free edge of said vanes to distort said vanes and release them to return to their normal shape and position.

4. A centrifugal separating element which comprises a centrifugal tube, an open ended off-take pipe extending through one end into said tube to form an annular passage at said end of said tube, a rotating collar on said off-take pipe, vanes mounted on said rotatable collar and extending radially in said off-take passage to a free end adjacent to said tube, said vanes being inclined to the length of said tube to form rotatory passages, said tube having elements to obstruct the rotation of the free ends of said vanes whereby said vanes are distorted upon rotation and then released to resume their normal shape.

5. The element of claim 4 in which said obstructing elements on said tube comprise recesses into which the free edges of said vanes project.

6. A centrifugal separating element which comprises a centrifugal tube, an open ended off-take pipe extending into said tube through one end thereof to form an annular passage between said pipe and said tube, radial vanes of flexible resilient material secured to said pipe in the entrance end of said annular passage and inclined to the length of said tube to form rotatory passages having free ends adjacent to said tube and arms rotatably mounted on said pipe to swing past the free edges of said vanes and thereby bend said vanes.

7. The element of claim 6 in which said vanes are mounted on a rigid collar on said off-take pipe.

8. The element of claim 6 in which said arms rotate closely adjacent the inner surface of said tube.

9. A centrifugal tube of flexible resilient material having an off-take pipe extending into one end thereof to form an annular passage having rotatory inlets to said passage and a deflector movable against said tube at the end of said tube opposite said inlets to bend and flex said tube.

10. The centrifugal element of claim 9 in which said deflecting element comprises a sidewise reciprocating pin and mounting element therefor.

11. The centrifugal separating element of claim 1 in which said centrifugal tube is of flexible resilient material and having a deflecting element to deflect the end of said tube opposite said inlet passages.

12. A centrifugal separator which comprises an inlet chamber having a pair of spaced tube sheets, centrifugal separating elements each comprising a centrifugal tube mounted at one end in one of said tube sheets and extending away therefrom, an off-take pipe mounted in the opposite tube sheet and extending through the space therebetween and co-axially into its respective centrifugal tube to form an annular passage therebetween, radial vanes of resilient flexible material extending radially in said annular passage from said off-take pipe to a free end adjacent the inner surface of said centrifugal tube, said vanes being inclined to the length of said tube to form rotatory inlets to said annular passage and means engaging the free ends of said vanes and movable about the axis of the respective tube to deflect and release said vanes.

13. The apparatus of claim 12 in which said centrifugal tubes are of resilient flexible material, and a deflector moving against the end of said tube opposite the end of said passage to deflect and distort said tube.

CHARLES B. McBRIDE.
PHILIP F. BEST.
SIDNEY R. OREM, Jr.

REFERENCES CITED

The following references are of record in the file of this patent:

UNITED STATES PATENTS

| Number | Name | Date |
|---|---|---|
| 828,189 | Burpee | Aug. 7, 1906 |
| 1,399,441 | Petersen | Dec. 6, 1921 |
| 2,433,774 | Madely | Dec. 30, 1947 |
| 2,438,827 | Shoffner | Mar. 30, 1948 |

FOREIGN PATENTS

| Number | Country | Date |
|---|---|---|
| 14,004 | Great Britain | June 17, 1913 |
| 402,075 | Great Britain | Nov. 22, 1933 |